United States Patent Office 2,863,802
Patented Dec. 9, 1958

2,863,802

TREATING PLANTS WITH THE SYSTEMICALLY ACTIVE FUNGICIDE, LOWER ALKYL, 2(3,3,3-TRIHALO-2-HYDROXYPROPYL)-PYRIDINE

William J. Pyne, Painesville, Ohio, assignor to Diamond Alkali Company, Cleveland, Ohio, a corporation of Delaware No Drawing. Application April 11, 1957
Serial No. 652,094

2 Claims. (Cl. 167—33)

This invention relates to the novel compounds 2-(3,3,3-trihalo-2-hydroxypropyl) pyridines, their preparation and application.

More specifically the compounds of this invention have the structure

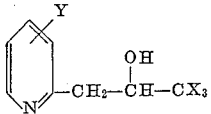

wherein Y is a lower alkyl group, such as methyl, ethyl, propyl, butyl, and the like, and X is a halogen, the term "halogen" being intended to include fluorine, chlorine, bromine and iodine, although chlorine is preferred.

A specific compound of the above type and the preferred embodiment of this invention is the compound 3 - methyl - 2 - (3,3,3-trichloro-2-hydroxypropyl) pyridine which has the structure

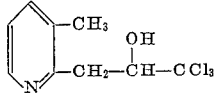

Compounds of this invention generally may be prepared by reacting a dialkyl pyridine such as lutidine, e. g., 2,3-dimethyl pyridine, or the other position isomers, with chloral or other trihaloacetaldehyde.

Compounds of this invention exhibit biological activity as will be set forth in some detail hereinafter in the specific examples. These compounds may be employed in a variety of formulations, both liquid and solid, including finely-divided powders, granular materials, various liquid formulations including solutions, concentrates, emulsifiable concentrates, slurries, and the like, depending upon the application intended and the formulation media employed. Hence, it will be appreciated that compounds of this invention form excellent biologically active ingredients which may be employed as essential ingredients in various compositions which may include such diluents, extenders, fillers, conditioners, solvents, and the like, as various clays, diatomaceous earth, talc, spent catalyst, alumina-silica materials and such liquids as water and various organic liquids such as acetone, kerosene, benzene, toluene, xylene, and other petroleum distillate fractions or mixtures thereof. When liquid formulations are employed or dry materials prepared which are to be used in liquid form, it is desirable in certain instances additionally to employ a wetting, emulsifying or dispersing agent to facilitate use of the formulation, Triton X–155 (alkyl aryl polyether alcohol).

In order that those skilled in the art may more completely understand the present invention and the preferred methods by which the same may be carried into effect, the following specific examples are offered:

EXAMPLE I

Part A

Into a 1-liter flask equipped with an agitator, thermometer and reflux condenser are introduced 108 g. of 2,3-dimethyl pyridine (lutidine) and 120 g. of chloral. This mixture is refluxed for eight hours at a temperature of 110°–113° C. The excess 2,3-dimethyl pyridine is then distilled off and the remaining material refluxed with n-decane. The material remaining is acidified with dilute HCl and neutralized with potassium carbonate.

The water layer is filtered off and the crude product dissolved in a mixture of isopropyl alcohol and n-hexane. The solution is treated with charcoal, filtered and concentrated to obtain a white solid melting at 70°–72° C. The chemical analysis of the product indicates obtention of the desired $C_9H_{10}Cl_3NO$ and is as follows:

| Elements | Actual | Calculated |
|---|---|---|
| C | 42.3 | 42.5 |
| H | 3.86 | 3.94 |
| Cl | 42.3 | 41.5 |
| N | 5.73 | 5.5 |

Part B

To illustrate biological activity, the product of Part A is applied to the soil in 4-inch clay pots containing growing tomato, corn and bean plants in amounts of 250 mg. per 4-inch clay pot. The results of such tests indicate that the tomato plants are killed and the corn plants stunted and substantially no effect is observed on the bean plant.

Part C

To demonstrate fungicidal effectiveness of compounds of this invention, the product of Part A is used in a test to measure effectiveness in protecting tomato foliage against infection by early blight fungus (*Alternaria solani*). The test is carried out by preparing two aqueous formulations of 2000 and 400 parts per million concentration, respectively, in water, using 5% acetone as a solvent and Triton X–155 at 0.01% as an emulsifier. Test plants were sprayed with 100 ml. of the formulation at 40 p. s. i. while rotated on a turntable. After the plants are dry, they are sprayed with a spore suspension containing approximately 20,000 conidia of *A. solani* per ml. The plants are then held in a saturated atmosphere for 24 hours at 70° F. to permit spore germination and are then placed in a greenhouse. The results of such tests indicate that controls of 77% and 69% are obtained at concentrations of 2000 and 400 parts per million, respectively.

The compound of Part A is formulated into a 25% wettable powder and dispersed in water to provide an actual concentration of the compound of 1%. Application of this material to cranberry bean plants kills the plants within 72 hours.

It is to be understood that although the invention has been described with specific reference to particular embodiments thereof, it is not to be so limited, since changes and alterations therein may be made which are within the full intended scope of this invention as defined by the appended claims.

What is claimed is:
1. The method of treating plants which comprises applying as a systemically active material, a composition containing as an essential active ingredient a lower alkyl - substituted - 2 - (3,3,3 - trihalo - 2 - hydroxypropyl)-pyridine.
2. The method according to claim 1 wherein the alkyl-substituted - 2 - (3,3,3 - trihalo - 2 - hydroxypropyl)-pyridine is 3-methyl-2-(3,3,3-trichloro-2-hydroxypropyl)-pyridine.

References Cited in the file of this patent

Winterfield et al.: C. A., vol. 34, column 2853 (1940) (Archiv. Pharm., vol. 277, pp. 192–200 (1939)).